United States Patent
Petr

(10) Patent No.: US 10,654,989 B2
(45) Date of Patent: May 19, 2020

(54) METHOD TO ENHANCE RELEASE OF POLYMERS FROM HOT METAL SURFACES

(71) Applicant: Rohm and Haas Company, Philadelphia, PA (US)

(72) Inventor: Michael T. Petr, Collegeville, PA (US)

(73) Assignee: Rohm and Haas Company, Collegeville, PA (US)

( * ) Notice: Subject to any disclaimer, the term of this patent is extended or adjusted under 35 U.S.C. 154(b) by 63 days.

(21) Appl. No.: 16/065,137

(22) PCT Filed: Dec. 26, 2016

(86) PCT No.: PCT/US2016/068617
§ 371 (c)(1),
(2) Date: Jun. 22, 2018

(87) PCT Pub. No.: WO2017/117078
PCT Pub. Date: Jul. 6, 2017

(65) Prior Publication Data
US 2019/0002668 A1    Jan. 3, 2019

Related U.S. Application Data

(60) Provisional application No. 62/271,771, filed on Dec. 28, 2015.

(51) Int. Cl.
| | |
|---|---|
| C08K 5/521 | (2006.01) |
| C08K 5/42  | (2006.01) |
| C08J 5/18  | (2006.01) |
| C08K 5/098 | (2006.01) |
| C08K 5/103 | (2006.01) |
| C08K 5/57  | (2006.01) |

(52) U.S. Cl.
CPC ......... *C08K 5/521* (2013.01); *C08J 5/18* (2013.01); *C08K 5/098* (2013.01); *C08K 5/103* (2013.01); *C08K 5/42* (2013.01); *C08K 5/57* (2013.01); *C08J 2327/06* (2013.01)

(58) Field of Classification Search
CPC ........ C08K 5/521; C08K 5/098; C08K 5/103; C08K 5/42; C08K 5/57; C08J 5/18; C08J 2327/06

USPC .......................................................... 524/145
See application file for complete search history.

(56) References Cited

U.S. PATENT DOCUMENTS

| | | | |
|---|---|---|---|
| 2006/0093407 A1* | 5/2006 | Toda ............... | G03G 15/0812 |
| | | | 399/284 |
| 2011/0021899 A1* | 1/2011 | Arps ................ | A61K 9/0009 |
| | | | 600/372 |

FOREIGN PATENT DOCUMENTS

| | | |
|---|---|---|
| CN | 104403180 | 3/2015 |
| JP | H07149985 A | 6/1995 |

OTHER PUBLICATIONS

PCT Search Report dated Mar. 15, 2017; from counterpart PCT/US2016/068617.
PCT IPRP dated Jul. 3 2018; from counterpart PCT/US2016/068617.
EP Office Action dated Aug. 16, 2018; from counterpart EP Application No. 16834148.5.
Chinese Office Action dated Jan. 20, 2020; from Counterpart Chinese Application No. 201680073573.4.

* cited by examiner

*Primary Examiner* — William K Cheung

(57) ABSTRACT

A method comprising contacting a polymer composition with a metal processing surface wherein the metal processing surface is at a temperature of equal to or greater than 90° C., wherein the polymer composition comprises one or more base polymers selected from the group consisting of polyvinyl halides, poly(meth)acrylics, polycarbonates, olefin-based polymers, and polystryrenes and a lubricant package which comprises at least one release agent of the following formulas

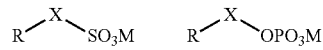

where R is an alkyl group having 6 or more carbon atoms, M is a metal or cation, and X may be absent or selected from the group consisting of aromatic groups and ester groups is provided.

12 Claims, No Drawings

METHOD TO ENHANCE RELEASE OF POLYMERS FROM HOT METAL SURFACES

This application is a 371 Application of PCT/US2016/068617, filed Dec. 26, 2016, which claimed priority to U.S. Provisional Application No. 62/271,771, filed on Dec. 28, 2015, the disclosures of which are incorporated herein by reference.

FIELD OF INVENTION

The disclosure relates to a method to enhance release of polymers from hot metal surfaces.

BACKGROUND OF THE INVENTION

An inherent problem in the melt processing of certain polymers, such as poly(vinyl chloride) (PVC), is that it tends to stick to hot metal surfaces. When sticking occurs, it causes the processing line (e.g, milling, molding) to be shut down and cleaned before it can be used again. With no lubrication, sticking may occur within minutes or hours. Therefore, lubricants are used, typically at very low loading levels, but these low levels do provide lubrication and release of the polymer from the hot metal surfaces. Small molecule as well as polymeric lubricants are often used separately or together, and both have their strengths and weaknesses. One feature of such lubricants is efficiency, which relates to a critical loading level above which no further lubrication effect is observed.

Despite known lubricants, there still exists a need for higher efficiency lubricants to prevent sticking on hot metal surfaces.

SUMMARY OF THE INVENTION

In one embodiment, the disclosure provides a method comprising contacting a polymer composition with a metal processing surface wherein the metal processing surface is at a temperature of equal to or greater than 90° C., wherein the polymer composition comprises one or more base polymers selected from the group consisting of polyvinyl halides, poly(meth)acrylics, polycarbonates, olefin-based polymers, and polystryrenes and a lubricant package which comprises at least one release agent of the following formulas

where R is an alkyl group having 6 or more carbon atoms, M is a metal or cation, and X may be absent or selected from the group consisting of aromatic groups and ester groups.

DETAILED DESCRIPTION OF THE INVENTION

The term "polymer," as used herein, refers to a polymeric compound prepared by polymerizing monomers, whether of the same or a different type. The generic term polymer thus embraces the term homopolymer (employed to refer to polymers prepared from only one type of monomer), and the term copolymer as defined hereinafter. Trace amounts of impurities (for example, catalyst residues) may be incorporated into and/or within the polymer.

The term "copolymer," as used herein, refers to polymers prepared by the polymerization of at least two different types of monomers. The term "olefin-based polymer," as used herein, refers to a polymer that comprises a majority amount of polymerized olefin monomer, for example ethylene or propylene (based on weight of the polymer) and, optionally, may contain at least one comonomer.

The term "ethylene-based polymer," as used herein, refers to a polymer that comprises a majority amount of polymerized ethylene monomer (based on weight of the polymer) and, optionally, may contain at least one comonomer.

The term "propylene-based polymer," as used herein, refers to a polymer that comprises a majority amount of polymerized propylene monomer (based on weight of the polymer) and, optionally, may comprise at least one comonomer.

The term "composition," as used herein, includes a mixture of materials which comprise the composition, as well as reaction products and decomposition products formed from the materials of the composition.

(Meth)acrylate means acrylate, methacrylate, or combinations of acrylate and methacrylate.

The polymer composition utilized in the method according to the disclosure comprises one or more base polymers and a lubricant composition.

The base polymer is selected from the group consisting of poly(vinylhalides), polyacrylics, polycarbonates, polyolefins, and polystryrenes. Exemplary poly(vinylhalides) include poly(vinylchloride) and poly(vinylidene chloride). Exemplary polyacrylics include homopolymers and copolymers of methyl methacrylate, ethyl methacrylate, butyl methacrylate, methyl acrylate, ethyl acrylate, butyl acrylate, 2-ethylhexyl acrylate, and any optional crosslinking monomers. Exemplary polycarbonates include aromatic polycarbonates, copolymers of polycarbonate (e.g., polycarbonate-polysiloxane, such as polycarbonate-polysiloxane block copolymer), linear polycarbonate, branched polycarbonate, and end-capped polycarbonate (e.g., nitrile end-capped polycarbonate). Exemplary polycarbonate materials include LEXAN Resins commercially available from SABIC Innovative Plastics IP. Exemplary polyolefins include ethylene-based polymers and propylene-based polymers. Exemplary polystyrenes include anionic polymerizable polystyrenes, syndiotactic polystyrenes, unsubstituted and substituted polystyrenes (e.g., poly(Cx-methyl styrene)).

The disclosure further provides the method according to any embodiment disclosed herein except that the base polymer comprises poly(vinylchloride).

According to the method of the present disclosure, the polymer composition is contacted with a metal processing surface wherein the metal processing surface is at a temperature of equal to or greater than 90° C. All individual values and subranges from equal to or greater than 90° C. are included and disclosed herein; for example, the contacting may occur at a temperature of equal to or greater than 90° C., or in the alternative, at a temperature of equal to or greater than 110° C., or in the alternative, at a temperature of equal to or greater than 120° C., or in the alternative, at a temperature of equal to or greater than 140° C., or in the alternative, at a temperature of equal to or greater than 150° C., or in the alternative, at a temperature of equal to or greater than 160° C., or in the alternative, at a temperature of equal to or greater than 170° C., or in the alternative, at a temperature of equal to or greater than 180° C.

Exemplary metal processing surfaces for use in embodiments of the inventive method include milling vessels, milling balls, extruder dies, molds, extruders, mills, and calenders.

The method according to the disclosure utilizes a lubricant package which comprises one or more of the following release agents

where R is an alkyl group having 6 or more carbon atoms, M is a metal or cation, and X may be absent or selected from the group consisting of aromatic groups and ester groups.

In an alternative embodiment, the lubricant package comprises at least 3 wt % of one of more of the following release agents

where R is an alkyl group having 6 or more carbon atoms, M is a metal, and
X may be absent or selected from the group consisting of aromatic groups and ester groups. All individual values and subranges from at least 3 wt % are included and disclosed herein. For example, the amount of the one or more release agents may be present in the lubricant package at levels of at least 3 wt %, 5 wt %, 10 wt %, 15 wt %, 20 wt %, 25 wt %, 35 wt %, 50 wt %, 55 wt %, 75 wt %, 90 wt % or 100 wt %. The one or more release agents are present in the lubricant package in intentional, non-negligible amounts.

In an alternative embodiment, the lubricant package consists of one of more of the following release agents

where R is an alkyl group having 6 or more carbon atoms, M is a metal or cation, and X may be absent or selected from the group consisting of aromatic groups and ester groups.

Exemplary release agents of the formula

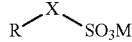

include sodium dodecylbenzenesulfonate, sodium hexadecanesulfonate, sodium tetradecanesulfonate, sodium hexanesulfonate, and sodium dioctylsulfosuccinate.

Exemplary release agents of the formula

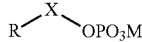

include sodium monodeceylphosphate.

Exemplary metals or cations, M, of the release agents include sodium, potassium, calcium, magnesium, or ammonium.

Exemplary alkyl groups, R, having 6 or more carbon atoms include linear and branched hexyl, octyl, decyl, dodecyl, tetradecyl, and hexadecyl groups.

Exemplary aromatic groups, X, include phenyl and naphthyl.

Exemplary ester groups, X, include formyl, acetyl, propanoyl, and butanoyl.

The disclosure further provides the method according to any embodiment disclosed herein, except that the one or more release agents are present in an amount from 0.001 to 5 phr. All individual values and subranges from 0.001 to 5 phr are included and disclosed herein; for example, the release agent level may range from a lower limit of 0.001, 0.01, 0.1, 1, 2, 3, or 4 phr to an upper limit of 0.005, 0.05. 0.5, 1.5, 2.5, 3.5, 4.5 or 5 phr. For example, the level of release agent in the polymer composition may range from 0.001 to 5 phr, or in the alternative, from 0.001 to 2.5 phr, or in the alternative, from 2.5 to 5 phr, or in the alternative, from 0.001 to 1.0 phr.

In some embodiments, the lubricant package may contain one or more lubricants other than the release agent. Such other lubricants include, but are not limited to metal or cation salts or fatty acids, such as calcium stearate, magnesium stearate, barium stearate, and calcium laurate; waxes, such as paraffin wax; polymers, such as Paraloid K-175 commercially available from the Dow Chemical Company; and internal lubricants, such as oxidize polyethylene, small molecule esters, polymeric esters, or combinations thereof as in those available under the name ADVALUBE, which are commercially available from the PMC group.

The disclosure further provides the method according to any embodiment disclosed herein, except that the polymer composition does not stick to the metal processing surface for a period of contacting of at least 30 seconds wherein the metal processing surface is at a temperature of greater than or equal to 170° C.

The disclosure further provides the method according to any embodiment disclosed herein, except that the polymer composition does not stick to the metal processing surface for a period of contacting of at least 1 minute wherein the metal processing surface is at a temperature of greater than or equal to 150° C., The disclosure further provides the method according to any embodiment disclosed herein except that the polymer composition does not stick to the metal processing surface for a period of contacting of at least 2 minutes wherein the metal processing surface is at a temperature of greater than or equal to 120° C.

The disclosure further provides the method according to any embodiment disclosed herein except that the polymer composition does not stick to the metal processing surface for a period of contacting of at least 3 minutes wherein the metal processing surface is at a temperature of greater than or equal to 90° C.

The disclosure further provides the method according to any embodiment disclosed herein, except that the lubricant composition comprises sodium dodecylbenzenesulfonate.

The disclosure further provides the method according to any embodiment disclosed herein, except that the lubricant composition comprises sodium hexadecanesulfonate or sodium tetradecanesulfonate.

The disclosure further provides the method according to any embodiment disclosed herein, except that the lubricant composition comprises sodium hexanesulfonate.

The disclosure further provides the method according to any embodiment disclosed herein except that the lubricant composition comprises sodium dioctylsulfosuccinate.

The disclosure further provides the method according to any embodiment disclosed herein except that the one or more polymers comprises one or more selected from the group consisting of polyvinyl chloride, chlorinated polyvinyl chloride, polyvinylidene chloride, and a copolymer of methyl methacrylate, butyl acrylate, and ethyl acrylate.

The disclosure further provides an article of manufacture comprising at least one component which comprises a polymer composition made by the method according to any embodiment disclosed herein In a particular embodiment, the article of manufacture is a film or sheet.

EXAMPLES

The following examples illustrate the present invention but are not intended to limit the scope of the invention.

Test Methods

Test methods include the following:

Sodium lauryl sulfate (SLS) was provided by Stepan Company (Northfield, Ill., USA) under the trade name POLYSTEP B-5-N. FORMOLON 614 PVC is a medium-low molecular weight PVC homopolymer having an inherent viscosity (measured according to ASTM D-5225) of 0.73, and is commercially available from *Formosa* Plastics Corporation, U.S.A. (Livingston, N.J., USA). ADVASTAB TM-181 (methyl tin stabilizer), ADVALUBE F-1005 (partial ester of glycerin internal lubricant), and LOXIOL G78V (calcium stearate external lubricant) are commercially available from the PMC Group (Mount Laurel, N.J., USA). All other chemicals were purchased from Sigma-Aldrich (St. Louis, Mo., USA). All of the chemicals were used in their present conditions with no additional purification.

The milling time to stick test was carried out at 200° C., which is much higher than normal PVC processing temperatures, in order to accelerate the sticking process and decrease the testing time to a maximum of 20 minutes. For the test, 165 g of the formulated PVC with the surfactants was applied to the Electric Collin Mill at 200° C. with the mill rolls stationary and closed tight, corresponding to about a 0.006 inch gap. Then, the rolls were turned on to low speed at 5 and 4 rpm on the front and back rolls, respectively. At this point, the timer was started, and after one rotation on the rolls, the speed was increased to 26 and 20 rpm on the front and back rolls, respectively. As the rolls turned, the sample that fell through was collected and added back to the rolls until all the material fused and wrapped around the rolls. Upon fusion, the gap was opened to about 0.015 inches so that the rolling bank of fused sample was about one cm thick. For the next two minutes, four cuts per minute were made with brass knife to ensure proper mixing. At the end of the two minutes, the rolls were stopped, and a 3 inch wide strip was cut across the front roll and pulled from left to right checking for a full release from roll. If the strip came off, it was returned to the rolls and checked again for release after another minute, and this cut and pull procedure was repeated every minute up to 20 minutes until sticking occurred. If a strip did stick, another strip was immediately cut and checked for release. If that second strip stuck as well, this time was recorded as the time to stick. If, at the end of 20 minutes, the sample did not stick, the test ended, and 20 minutes was recorded as the maximum time to stick. Finally, purge material was applied to the mill and mixed in with sample to facilitate final release in order to clean the mill and proceed to the next sample. As used herein, the meaning of the strip "sticking" refers to the inability of the strip to be removed in whole without the strip stretching to the point of breaking.

Table 1 provides the formulation for a first PVC masterbatch formulation. Table 2 provides the formulation for a second PVC masterbatch formulation. Several comparative and inventive runs were made using each of the PVC masterbatch formulations. As shown in Tables 3-4, those runs with no calcium stearate (LOXIOL G78V) used the first PVC masterbatch while those runs in Table 5 with 0.2 phr LOXIOL G78V used the second PVC masterbarch.

TABLE 1

| Material | Amount (parts per hundred resin, "phr") |
|---|---|
| FORMOLON 614 PVC | 100 |
| ADVASTAB TM 181 | 2 |
| ADVALUBE F-1005 | 1 |
| Total | 103 |

TABLE 2

| Material | Amount (phr) |
|---|---|
| FORMOLON 614 PVC | 100 |
| ADVASTAB TM 181 | 2 |
| ADVALUBE F-1005 | 0.8 |
| LOXIOL G78V | 0.2 |
| Total | 103 |

The Comparative Example runs utilized either no surfactants, or release agents, or surfactants outside the scope of the present invention. Tables 3-4 illustrate the time to stick using the first PVC masterbatch (no calcium stearate) with varying amounts (0 phr to 1 phr) lubricant or release agent. Table 5 illustrates the time to stick using the second PVC masterbatch (0.2 phr calcium stearate) with varying amounts (0 phr to 1 phr) lubricant or release agent. In each of Tables 2-5, the time to stick is reported in minutes (min) and those cells which are left blank indicate that no measurement was made under those conditions. As is apparent from Tables 3-5, the Inventive Examples show increased times to stick in comparison to the Comparative Examples.

TABLE 3

| | | Milling Time to Stick (min) phr Surfactant | | | | | | | | |
|---|---|---|---|---|---|---|---|---|---|---|
| Example | Chemical Name | 0 | 0.002 | 0.004 | 0.005 | 0.006 | 0.008 | 0.01 | 0.012 | 0.014 |
| Comp Ex. 1 | None | 1 | | | | | | | | |
| Inv. Ex. 4 | sodium 4-dodecylbenzenesulfonate | 1 | 1 | | 1 | | | 1 | 1 | 1 |
| Inv. Ex. 5 | sodium 1-hexadecanesulfonate | 1 | 20 | 20 | | 20 | 20 | 20 | | |

TABLE 4

| Example | Surfactant Chemical Name | Milling Time to Stick (min) phr Surfactant | | | | | | | | |
|---|---|---|---|---|---|---|---|---|---|---|
| | | 0.016 | 0.018 | 0.02 | 0.03 | 0.05 | 0.1 | 0.2 | 0.5 | 1 |
| Comp Ex. 2 | sodium benzenesulfonate | | | 1 | 1 | | | | | |
| Comp Ex. 3 | sodium 2-naphthalenesulfonate | | | 1 | 1 | | | | | |
| Comp Ex. 4 | sodium methanesulfoante | | | 1 | 1 | | | | | |
| Comp Ex. 5 | sodium p-toluenesulfonate | | | 1 | 1 | | | | | |
| Inv. Ex. 1 | sodium 1-hexanesulfonate | | | 20 | 20 | | | | | |
| Inv. Ex. 2 | sodium 4-octylbeznene sulfonate | | | 20 | 20 | | | | | |
| Inv. Ex. 3 | sodium 1-decanesulfonate | | | 20 | 20 | | | | | |
| Inv. Ex. 4 | sodium 4-dodecylbenzenesulfonate | 1 | 20 | 20 | 20 | 20 | | 20 | 20 | 20 |
| Inv. Ex. 6 | sodium dioctylsulfosuccinate | | | 1 | 1 | | 20 | | | |
| Comp. Ex. 10 | sodium phenylphosphate | | | 1 | 1 | | 20 | | | |
| Inv. Ex. 8 | sodium monodecylphosphate | | | 1 | 1 | | | | | |

TABLE 5

| Example | Surfactant Chemical Name | Mill Time to Stick (min) phr Surfactant | | | | | | |
|---|---|---|---|---|---|---|---|---|
| | | 0 | 0.002 | 0.005 | 0.01 | 0.02 | 0.1 | 1 |
| Comp Ex. 11 | None | 3 | | | | | | |
| Comp Ex. 12 | sodium laurylsulfate | 3 | | | 3 | | | |
| Comp Ex. 2 | sodium benzenesulfonate | 3 | 3 | | | 3 | | |
| Comp Ex. 3 | sodium 2-naphthalenesulfonate | 3 | 3 | | | | | |
| Comp Ex. 4 | sodium methanesulfoante | 3 | 3 | | | 3 | | |
| Comp Ex. 5 | sodium p-toluenesulfonate | 3 | 3 | | | | | |
| Comp Ex. 6 | sodium 1-ethanesulfonate | 3 | | | | 3 | | |
| Comp Ex. 7 | sodium 1-propanesulfonate | 3 | | | | 3 | | |
| Comp Ex. 8 | sodium 1-butanesulfonate | 3 | | | 3 | 3 | | |
| Comp Ex. 9 | sodium 1-pentanesulfonate | 3 | | | 2 | 4 | | |
| Inv. Ex. 1 | sodium 1-hexanesulfonate | 3 | 3 | | 4 | 20 | | |
| Inv. Ex. 2 | sodium 4-octylbeznene sulfonate | 3 | 3 | | 5 | 20 | | |
| Inv. Ex. 3 | sodium 1-decanesulfonate | 3 | 4 | | 6 | 20 | | |
| Inv. Ex. 4 | sodium 4-dodecylbenzenesulfonate | 3 | | 3 | 7 | 20 | | |
| Inv. Ex. 5 | sodium 1-hexadecanesulfonate | 3 | 5 | | 15 | 20 | | |
| Inv. Ex. 6 | sodium dioctylsulfosuccinate | 3 | 4 | | 6 | | | |
| Inv. Ex. 7 | sodium 4-dodecyl-4'-diphenyloxide disulphonate | 3 | | | 2 | | 3 | 5 |
| Comp. Ex. 10 | sodium phenylphosphate | 3 | 3 | | 3 | | | |
| Inv. Ex. 8 | sodium monodecylphosphate | 3 | 3 | | 9 | | | |

The present invention may be embodied in other forms without departing from the spirit and the essential attributes thereof, and, accordingly, reference should be made to the appended claims, rather than to the foregoing specification, as indicating the scope of the invention.

I claim:

1. A method comprising
   contacting a polymer composition with a metal processing surface wherein the metal processing surface is at a temperature of equal to or greater than 90° C.,
   wherein the polymer composition comprises one or more base polymers selected from the group consisting of polyvinyl halides, poly(meth)acrylics, polycarbonates, olefin-based polymers, and polystryrenes and a lubricant package which comprises at least one release agent of the following formulas

where R is an alkyl group having 6 or more carbon atoms, M is a metal or cation, and X may be absent or selected from the group consisting of aromatic groups and ester groups.

2. The method according to claim 1, wherein the release agent is present in an amount from 0.001 to 5 phr.

3. The method according to claim 1, wherein the release agent is part of a lubricant package at 3 wt % or more.

4. The method according to claim 1, wherein the polymer composition does not stick to the metal processing surface for a period of contacting of at least 30 seconds wherein the metal processing surface is at a temperature of greater than or equal to 170° C.

5. The method according to claim 1, wherein the polymer composition does not stick to the metal processing surface for a period of contacting of at least 1 minute wherein the metal processing surface is at a temperature of greater than or equal to 150° C.

6. The method according to claim 1, wherein the polymer composition does not stick to the metal processing surface for a period of contacting of at least 2 minutes wherein the metal processing surface is at a temperature of greater than or equal to 120° C.

7. The method according to claim 1, wherein the polymer composition does not stick to the metal processing surface for a period of contacting of at least 3 minutes wherein the metal processing surface is at a temperature of greater than or equal to 90° C.

8. The method according to claim 1, wherein the release agent is sodium dodecylbenzenesulfonate.

9. The method according to claim 1, wherein the release agent is sodium hexadecanesulfonate or sodium tetradecanesulfonate.

10. The method according to claim 1, wherein the release agent is sodium hexanesulfonate.

11. The method according to claim 1, wherein the release agent is sodium dioctylsulfosuccinate.

12. The method according to claim 1, wherein the one or more polymers comprises one or more selected from the group consisting of polyvinyl chloride, chlorinated polyvinyl chloride, polyvinylidene chloride, and a copolymer of methyl methacrylate, butyl acrylate, and ethyl acrylate.

* * * * *